(12) United States Patent
Zhang (10) Patent No.: US 7,599,449 B2
(45) Date of Patent: Oct. 6, 2009

(54) HYBRID MODULUS BLIND EQUALIZATION FOR QUADRATURE AMPLITUDE MODULATION (QAM) RECEIVERS

(75) Inventor: Li Zhang, Xi'an (CN)

(73) Assignee: Montage Technology Group, Ltd, Grand Cayman (*) Notice: Subject to any disclaimer, the term of this patent is extended or adjusted under 35 U.S.C. 154(b) by 562 days.

(21) Appl. No.: 11/279,200

(22) Filed: Apr. 10, 2006

(65) Prior Publication Data
US 2007/0237250 A1 Oct. 11, 2007

(51) Int. Cl.
*H04L 27/00* (2006.01)
(52) U.S. Cl. .................. 375/324; 375/232; 375/235
(58) Field of Classification Search .......... 375/229, 375/232, 233, 235
See application file for complete search history.

(56) References Cited

U.S. PATENT DOCUMENTS

| | | | |
|---|---|---|---|
| 5,311,546 A | 5/1994 | Paik et al. | |
| 5,537,439 A * | 7/1996 | Choi | 375/232 |
| 5,675,394 A * | 10/1997 | Choi | 348/614 |
| 6,108,375 A * | 8/2000 | Farrokh et al. | 375/235 |
| 6,178,201 B1 * | 1/2001 | Hillery | 375/232 |
| 6,259,743 B1 * | 7/2001 | Garth | 375/261 |
| 6,418,164 B1 | 7/2002 | Endres et al. | |
| 6,426,972 B1 | 7/2002 | Endres et al. | |
| 6,816,548 B1 * | 11/2004 | Shiue et al. | 375/233 |
| 6,859,492 B1 * | 2/2005 | Hillery | 375/232 |
| 6,950,477 B2 * | 9/2005 | Meehan et al. | 375/267 |
| 7,031,405 B1 * | 4/2006 | Touzni et al. | 375/326 |
| 7,418,033 B2 * | 8/2008 | Barksdale | 375/232 |
| 2004/0052309 A1 * | 3/2004 | Li | 375/232 |
| 2007/0206707 A1 * | 9/2007 | Chen | 375/320 |

OTHER PUBLICATIONS

Dominique N. Godard; Self-Recovering Equalization and Carrier Tracking in Two-Dimensional Data Communication Systems, IEEE Trans. Communications, vol. COM-28, pp. 1867-1875, Nov. 1980.

C. R. Johnson, Jr, etc, "Blind equalization using the constant modulus criterion: a review," Proc. Of IEEE, vol. 86, Oct. 1998.

M. Goursat, etc, "Blind Equalizers," IEEE Trans. Of Communications, vol. COM-28, Aug. 1984.

(Continued)

*Primary Examiner*—Emmanuel Bayard
(74) *Attorney, Agent, or Firm*—Ivy Y. Mei (57) ABSTRACT

Methods and apparatuses for blind equalizers with a hybrid adaptation error. In one embodiment, a Quadrature Amplitude Modulation (QAM) signal receiver, includes: a filter to reduce error in equalization, the filter to output a QAM signal; a decision engine coupled to the filter to determine a symbol based on the QAM signal; a first error generator coupled to the filter to compute a first error signal based on the QAM signal and a constant; a second error generator coupled to the filter and the decision engine to compute a second error signal based on the QAM signal and the determined symbol; an error combinator coupled to the first and second error generators to generate a combined error signal from the first and second error signals; and an adaptation engine coupled with the error combinator and the filter to reduce a equalization error according to the combined error signal.

20 Claims, 6 Drawing Sheets

OTHER PUBLICATIONS

G. Picchi, etc, "Blind equalization and carrier recovery using a "stop-and-go" decision-directed algorithm," IEEE Trans. Of Communications, vol. COM-35, Sep. 1987.

MJ Ready and RP Gooch, "Blind Equalization Based on Radius Directed Adaptation," Proc. 1990 IEEE Int. Conf. Acoust., Speech, Signal Processing, Albuquerque., NM, pp. 1699-1702, Apr. 1990.

* cited by examiner (Prior Art)

HYBRID MODULUS BLIND EQUALIZATION FOR QUADRATURE AMPLITUDE MODULATION (QAM) RECEIVERS

FIELD OF THE TECHNOLOGY

At least some embodiments of the invention relate to blind equalizer in general and, particularly but not exclusively to blind equalizer for Quadrature Amplitude Modulation (QAM) receivers.

BACKGROUND

Quadrature Amplitude Modulation (QAM) can be used to represent data by changing, or modulating, the amplitude of two carrier waves, which are out of phase with each other by 90 degrees and are thus called quadrature carriers. The quadrature carriers can be modulated in amplitude to represent digital symbols being transmitted. When the amplitude of modulation in the two quadrature carriers for a symbol is represented along the real and imaginary axes in a complex plane, the symbol can be represented as a point in the complex plane. A set of symbols used in a QAM scheme can be collective called a constellation. A constellation diagram shows the set of symbols in the complex plane.

A rectangular QAM constellation includes a set of symbols arranged on a rectangular grid. Rectangular QAM constellations may not be optimal in that the points in the constellation do not maximally space from each other. None rectangular QAM constellations may also be used to improve separation, but they are harder to modulate and demodulate than rectangular QAM constellations.

As the bandwidth demand increases, higher and higher QAM sizes have been adopted in many latest applications, such as DVB-C receiver and cable modem. The specifications for such applications include the ability to handle severe channel conditions such as low signal to noise ratio (SNR) or large echoes. To mitigate such impairments on the channel and to correctly recover the transmitted signal, various channel equalization technologies are employed.

Signals transmitted through a transmission channel suffer from non-ideal channel characteristics such as Additive White Gaussian Noise (AWGN), Inter Symbol Interference (ISI), fading, and phase distortion, etc. The transmitted signals can be distorted by the channel characteristics, which is typically unknown.

Equalization is a technique used to reduce distortion and compensate for signal loss (attenuation). Typically, an equalizer uses an adjustable filter which is adjusted to compensate the unknown channel characteristics. Blind equalization is a type of technology, which does not use any training sequence and thus reduces the system overhead. Blind equalization has been widely used to adapt the receiver to the channel conditions. Many blind equalization algorithms have been developed.

C. R. Johnson, et al., described a Constant Modulus Algorithm (CMA) in "Blind Equalization using the constant modulus criterion: a review, Proc. of IEEE, Vol. 86, October 1998. See also "Self-Recovering Equalization and Carrier Tracking in Two-Dimensional Data Communication Systems by Dominique N. Godard in IEEE Trans. Communications, vol. COM-28, pp. 1867-1875, November 1980.

Constant Modulus Algorithm (CMA) is a simple and effective way to achieve channel equalization. A Constant Modulus Algorithm minimizes an error function for equalization. The error function is based on the difference between the equalizer output and a constant constellation radius:

$$[|y|^p - K]^q$$

where y is the equalizer output; K a constant; and p and q are typically integers.

Figure 1:
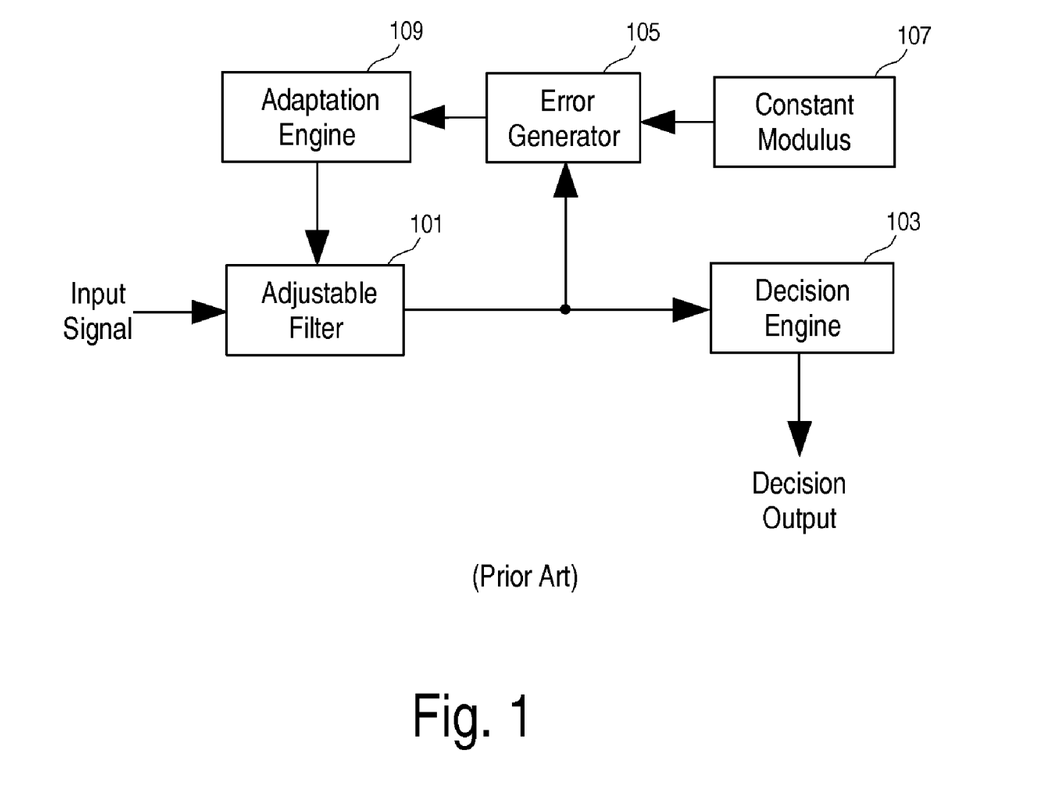
FIG. 1 shows a block diagram of a conventional receiver with a Constant Modulus Algorithm (CMA) based blind equalizer.

FIG. 1 shows a block diagram of a conventional CMA-based blind equalizer. In FIG. 1, the adjustable filter (101) has a number of coefficients, also referred as tap weights, which determine the transfer function of the equalizer. The input signal to the adjustable filter (101) may be distorted due to the unknown channel characteristics. The adaptation engine (109) adjusts the tap weights according to the error generator (105) to reduce the error between the output of the adjustable filter (101) and the constant modulus (107). The decision engine (103) identifies the symbol being transmitted from the output of the adjustable filter (101) to generate the decision output (103). The tap weights are continuously adjusted by the adaptation engine (109) to reduce the error until the equalizer converges.

A CMA equalizer has a large convergence range. However, since a CMA equalizer uses only one modulus, a large amount of residual mean square error (MSE) may exist after convergence, due to adaptation noise. The residual error may cause decision errors for high order QAM signals.

The conventional CMA was modified to develop improved algorithms, such as a Sato algorithm (see, e.g., M. Goursat, et al., in "Blind Equalizers, IEEE Trans. of Communications, Vol. COM-28, August 1984) and a "stop-and-go" decision-directed algorithm (see, e.g., G. Picchi, et al, in "Blind equalization and carrier recovery using a 'stop-and-go' decision-directed algorithm, IEEE Trans. Of Communications, Vol. COM-35, in September 1987).

M. J. Ready and R. P. Gooch describes a multi-modulus algorithm in "blind equalization based on radius directed adaptation, Proc. 1990 IEEE Int. Conf. Acoust., Speech, Signal Processing, Albuquerque, N.Mex., PP 1699-1702, 1990, in which radius directed adaptation is based on the known modulus of the constellation symbol radii. The error function is based on the difference between the equalizer output and the nearest constellation radius:

$$[|y|^p - K_d]^q$$

where y is the equalizer output; $K_d$ is the radii of the nearest constellation symbol for the equalizer output y; and common values for (p, q) are (1, 1), (1, 2), (2, 1), (2, 2), etc.

SUMMARY OF THE DESCRIPTION

Methods and apparatuses for blind equalizers with a hybrid adaptation error are described herein. Some embodiments of the invention are summarized in this section.

One embodiment of the present invention includes a Quadrature Amplitude Modulation (QAM) signal receiver that includes a filter to reduce error in equalization, the filter to output a QAM signal; a decision engine coupled to the filter to determine a symbol based on the QAM signal; a first error generator coupled to the filter to compute a first error signal based on the QAM signal and a constant; a second error generator coupled to the filter and the decision engine to compute a second error signal based on the QAM signal and the determined symbol; an error combinator coupled to the first and second error generators to generate a combined error signal from the first and second error signals; and an adaptation engine coupled with the error combinator and the filter to reduce a equalization error according to the combined error signal.

In one embodiment of the invention, the first error generator includes a constant modulus algorithm (CMA) error generator.

In one embodiment of the invention, the second error generator includes a decision modulus algorithm (DMA) error generator. The error combinator combines the first and second error signals according to a difference between the QAM signal and the determined symbol.

In one embodiment of the invention, the error combinator applies a first weight on the first error signal and a second weight on the second error signal to generate the combined error signal; and the first and second weights are determined based on the difference between the QAM signal and the determined symbol.

In one embodiment of the invention, the first weight decreases relative to the second weight to zero as the difference between the QAM signal and the determined symbol decreases; and the second weight decreases relative to the first weight to zero as the difference between the QAM signal and the determined symbol increases to above a threshold.

One embodiment of the invention includes a method that includes receiving a Quadrature Amplitude Modulation (QAM) signal (e.g., in a decision engine); determining a symbol corresponding to the received QAM signal (e.g., received in the decision engine); computing a first error in equalization based on a constant modulus and a second error in equalization based on the determined symbol; and adjusting a filter to reduce error in equalization according to the first error and the second error.

In one embodiment of the invention, the first error is based on a constant modulus algorithm (CMA) error.

In one embodiment of the invention, the second error is based on a difference between the modulus of the determined symbol and the modulus of the received QAM signal.

In one embodiment of the invention, the step of adjusting the filter includes combining the first error and the second error to adjust the filter.

In one embodiment of the invention, the step of combining the first error and the second error includes weighting the first error against the second error according to a difference between the determined symbol and the received QAM signal.

In one embodiment of the invention, a weight for the first error decreases relative to a weight for the second error when the difference between the determined symbol and the received QAM signal decreases.

In one embodiment of the invention, the said combining the first error and the second error includes determining a weighted average of the first error and the second error according to a difference between the determined symbol and the received QAM signal.

In one embodiment of the invention, a weight for the first error decreases to zero when the difference between the determined symbol and the received QAM signal decreases to below a threshold.

In one embodiment of the invention, the weight for the second error decreases to zero when the difference between the determined symbol and the received QAM signal increases to above a threshold.

One embodiment of the invention includes a circuit including means for receiving a Quadrature Amplitude Modulation (QAM) signal; means for determining a symbol corresponding to the received QAM signal; means for computing a first error in equalization based on a constant modulus and a second error in equalization based on the determined symbol; and means for adjusting a filter to reduce error in equalization according to the first error and the second error.

In one embodiment of the invention, the first error is based on a constant modulus algorithm (CMA) error; and the second error is based on a difference between the modulus of the determined symbol and the modulus of the received QAM signal.

In one embodiment of the invention, the means for adjusting the filter includes means for weighting the first error against the second error according to an confidence level in the determined symbol.

In one embodiment of the invention, a weight for the first error decreases relative to a weight for the second error when the confidence level increases.

In one embodiment of the invention, the weight for the first error decreases to zero when the confidence level increases to above a first threshold; and the weight for the second error decreases to zero when the confidence level decreases to below a second threshold.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION OF THE INVENTION

The following description and drawings are illustrative of the invention and are not to be construed as limiting the invention. Numerous specific details are described to provide a thorough understanding of the present invention. However, in certain instances, well-known or conventional details are not described in order to avoid obscuring the description of the present invention. References to one or an embodiment in the present disclosure are not necessarily references to the same embodiment; and, such references mean at least one.

One embodiment of the present invention provides a hybrid modulus blind equalization algorithm with small residual mean square error and large convergence range (e.g., for high order QAM constellations).

An equalization algorithm that determines the error function using the output of the QAM decision engine can be called a Decision Modulus Algorithm (DMA). For example, a DMA error generator may compute the error using the modulus of the input of the QAM decision engine and the modulus of the output of the QAM decision engine.

Upon convergence, a DMA may achieve zero residual error. However, the convergence range of the DMA can be fairly limited, especially when the QAM size increases.

One embodiment of the invention provides a hybrid scheme which has the advantage of a large convergence range and the advantage of zero residual error upon convergence.

One embodiment of the invention includes a hybrid modulus algorithm for blind equalization, which uses an adaptation error signal generated by a combination of a CMA (Constant Modulus Algorithm) error and a DMA (Decision Modulus Algorithm) error. The hybrid modulus algorithm has a reduced residual mean square error (MSE) after convergence, while having the same acquisition ability as a CMA-based blind equalizer. The hybrid modulus algorithm can be used for digital QAM (Quadrature Amplitude Modulation) signal constellations, especially for high constellation sizes.

In one embodiment of the invention, a decision modulus algorithm (DMA) is used together with a constant modulus algorithm (CMA); the adaptation error signal is calculated based on both the DMA error and the CMA error; and a weight controller is used to automatically adjust the ratio of the two errors according to the confidence level. The adaptive weight controller determines how the hybrid error signal is composed by the CMA error and the DMA error. By adaptively introducing the decision information during the process of convergence, the hybrid error signal for adaptation automatically contains more CMA error (non-decision component) when in the capture phase and more DMA error (decision component) when the equalizer is about to converge. Therefore the adaptation is improved in terms of residual error while keeps the range of convergence as large as the CMA.

Figure 2:
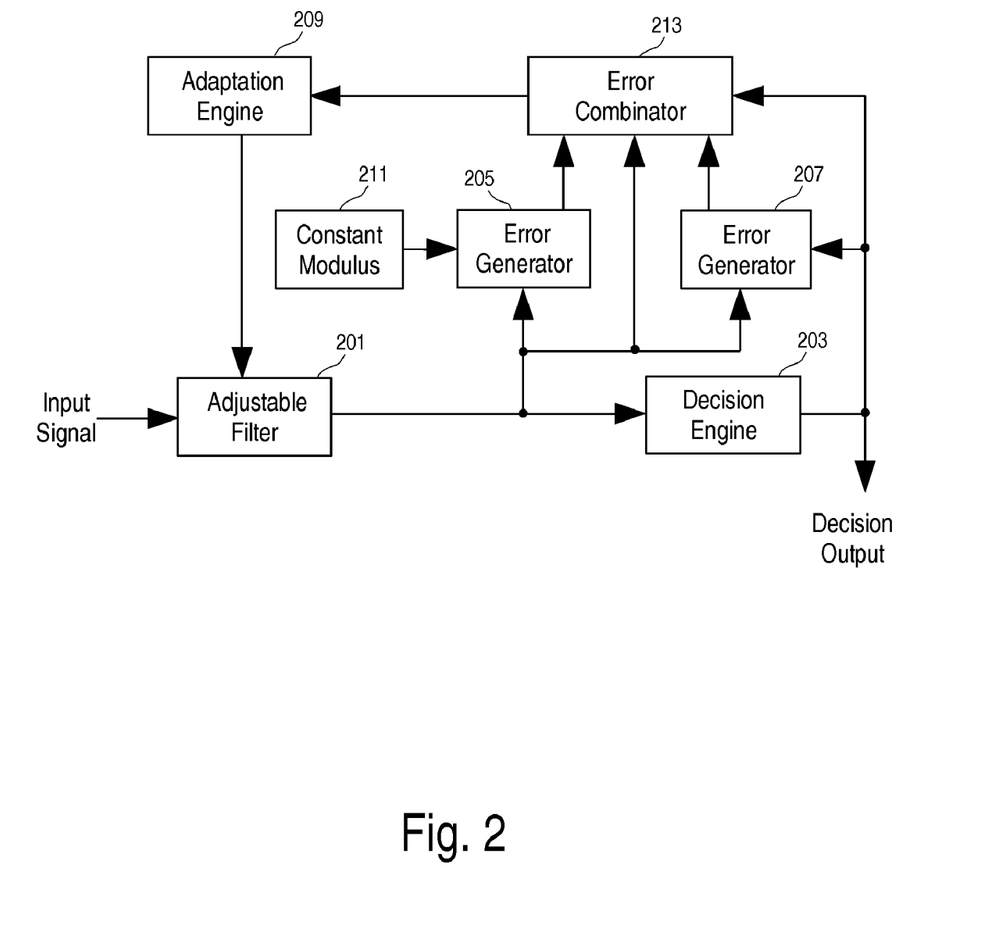
FIG. 2 shows a block diagram of a Quadrature Amplitude Modulation (QAM) receiver according to one embodiment of the invention.

FIG. 2 shows a block diagram of a Quadrature Amplitude Modulation (QAM) receiver according to one embodiment of the invention.

In FIG. 2, the input signal to the equalizer is corrected using the adjustable filter (201). The output of the adjustable filter (201) is used by the decision engine (203) as an input QAM signal to determine the decision output.

In FIG. 2, one error generator (205) is based on a constant modulus (211); and another error generator (207) is based on the decision output. The error signals from the error generators (205 and 207) are combined to drive the adaptation engine (209), which adjusts the adjustable filter (201) to reduce equalization error.

The constant modulus based error generator (205) can be designed according to a CMA, which compares the output of the adjustable filter with a pre-calculated constant modulus to generate an error signal. If the error signal from the error generator (205) were used to drive the adaptation engine (209) alone, the equalizer would have a large convergence range and a large residual MSE after convergence.

The decision based error generator (207) compares the output of the adjustable filter with a decision output to generate an error signal. If the error signal from the error generator (207) were used to drive the adaptation engine (209) alone, the equalizer would have a small convergence range and a small residual MSE after convergence.

In one embodiment of the invention, an error combinator (213) is used to combine the error signals from both the error generators (205 and 207) to drive the adaptation engine (209). The error signal generated from the decision based error generator (207) is used for small residual MSE after convergence; and the error signal generated from the constant modulus based error generator (205) is used for large convergence range.

In one embodiment of the invention, the error combinator (213) mixes the error signals for the error generators (205 and 207) according to the confidence level in the decision output of the decision engine. The confidence level may be determined based on the difference between the input and output of the decision engine (203). When the confidence level increase, more error signals from the decision based error generator (207) is used to drive the adaptation engine (209) than the error signals from the constant modulus based error generator (211). When the confidence level decreases, more error signals from the constant modulus based error generator (211) is used to drive the adaptation engine (209) than the error signals from the decision based error generator (207).

Thus, in the capture phase, more CMA error component is in the output of the error combinator (213) to ensure a large convergence range. In the tracking phase, more DMA error component is in the output of the error combinator (213) so that a smaller residual MSE can be achieved. Thus, the overall performance of the equalizer is improved.

The proposed scheme uses an adaptation error signal generated by a mixture of the CMA error and the DMA error. A weight controller automatically determines the weights of the two errors according to their respective confidence levels.

Figure 3:
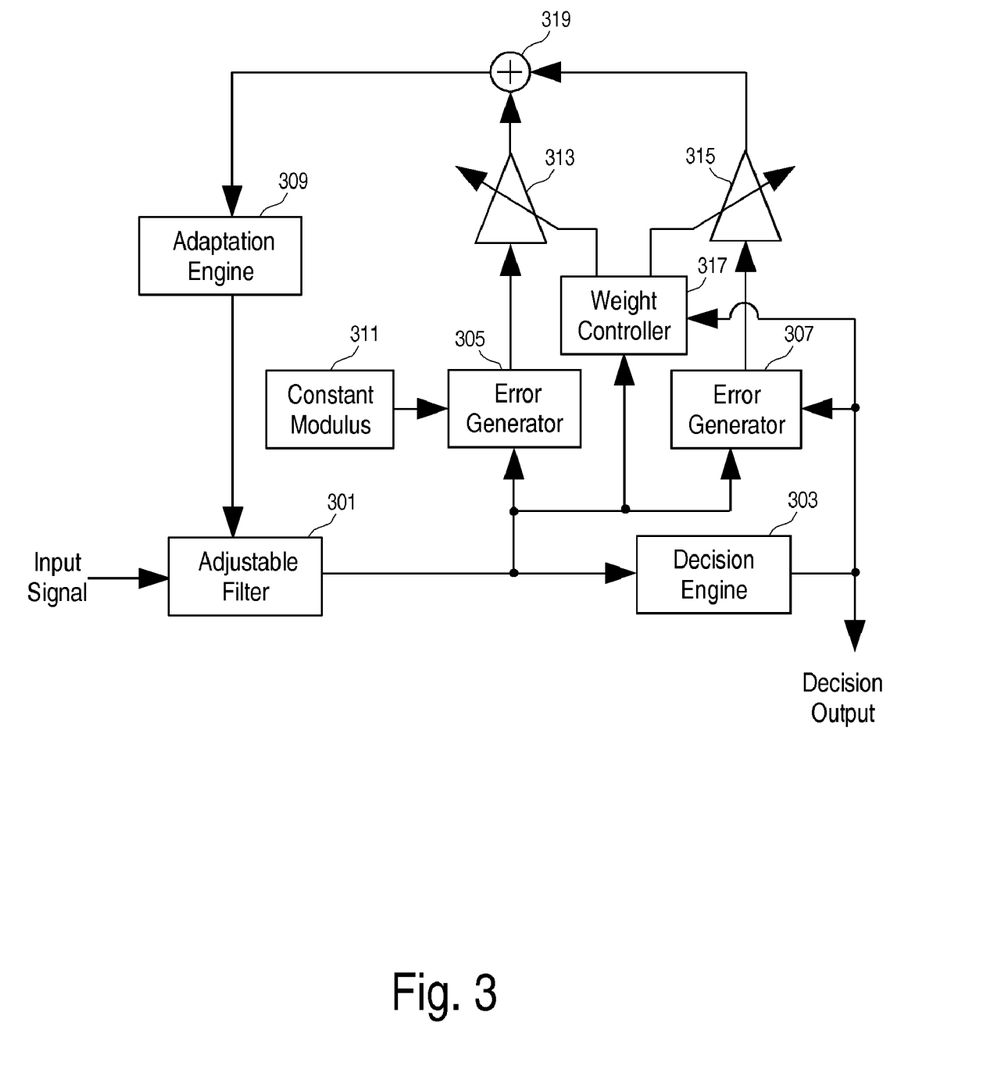
FIGS. 3-4 shows example block diagrams of blind equalizers according to embodiments of the invention.
Figure 4:
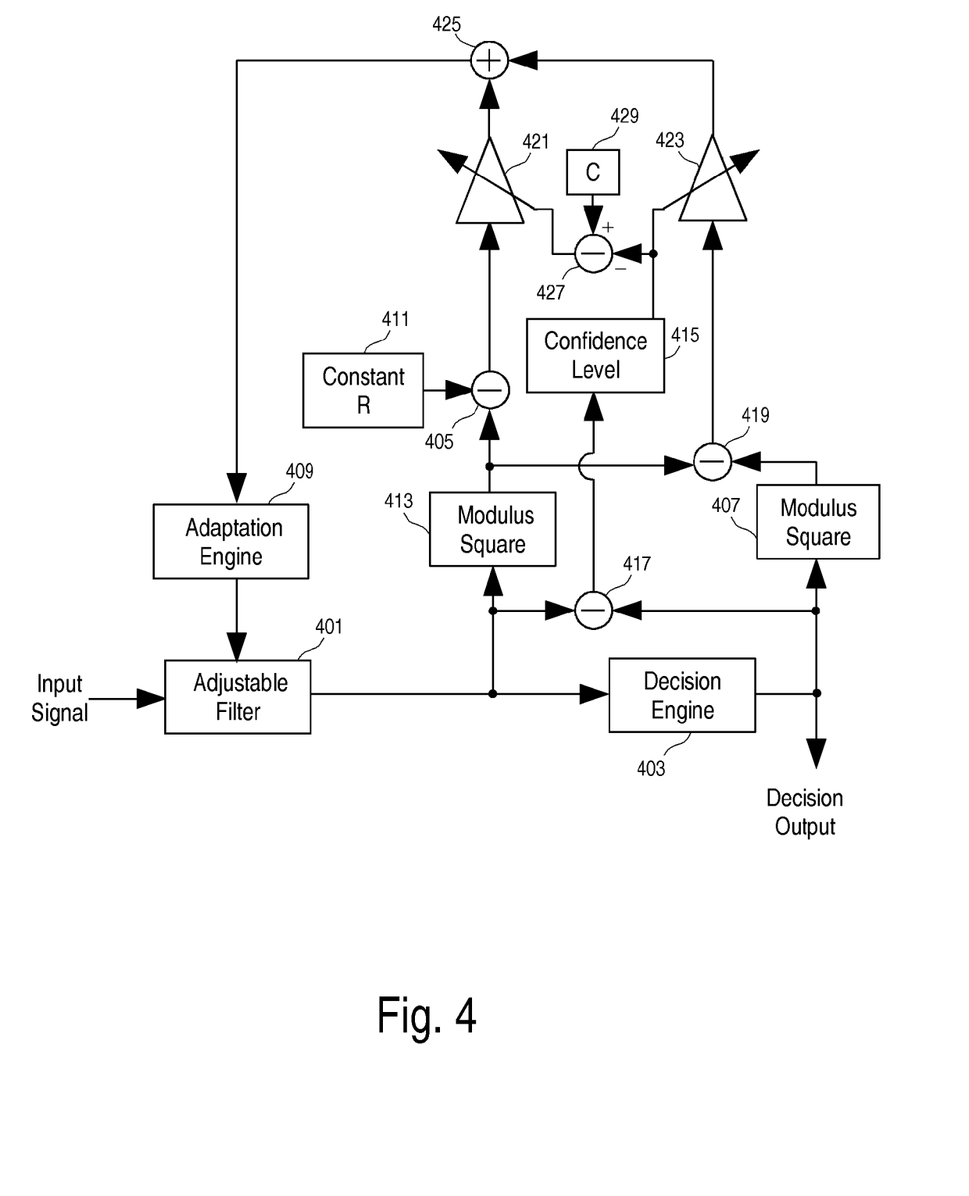

FIGS. 3-4 shows example block diagrams of blind equalizers according to embodiments of the invention.

In FIG. 3, the error signals from the error generators (305 and 307) are weighted using adjustable scalers (313 and 315) and summed using an adder (319). The output of the adder (319) drives the adaptation engine (309) to adjust the filter (301) to reduce the equalization error.

In FIG. 3, the weight controller (317) determines weights for error signals from the error generator (305 and 307) according to a confidence level indicator computed based on the input to and output from the decision engine (303). When the input to and output from the decision engine (303) are close to each other, the confidence level is high; the weight for the error determined based on the decision output is higher than the weight for the error determined based on the constant modulus (311). When the input to and output from the decision engine (303) are not close to each other, the confidence level is low; the weight for the error determined based on the decision output is lower than the weight for the error determined based on the constant modulus (311).

In FIG. 4, a modulus square unit (413) computes the modulus square of the output of the adjustable filter (401); and a modulus square unit (407) computes the modulus square of the output of the decision engine (403).

A subtractor (405) computes the difference between the constant (411) and the modulus square of the output of the adjustable filter (401), to provide an error signal of a CMA type. A subtractor (419) computes the difference between the modulus square of the output of the adjustable filter (401) and the modulus square of the output of the decision engine (403), to provide an error signal of a DMA type.

The error signals generated from the subtractors (405) and (419) are weighted by scalers (421 and 423) and summed by the adder (425) to generate a combined error signal to drive the adaptation engine (409), which adjusts the filter (401) to reduce equalization error.

In FIG. 4, a subtractor (417) determines the difference between the input and output of the decision engine (403). The difference is used to determine a confidence level (415) in the output of the decision engine (403). When the confidence level (415) increases, the weight for the DMA type of error increases. The confidence level is subtracted from a constant (429) by a subtractor (427) to generate the weight for the CMA type of error. Thus, the confidence level (415) controls the scalers (421 and 423) to combine the CMA and DMA types of errors.

Figure 5:
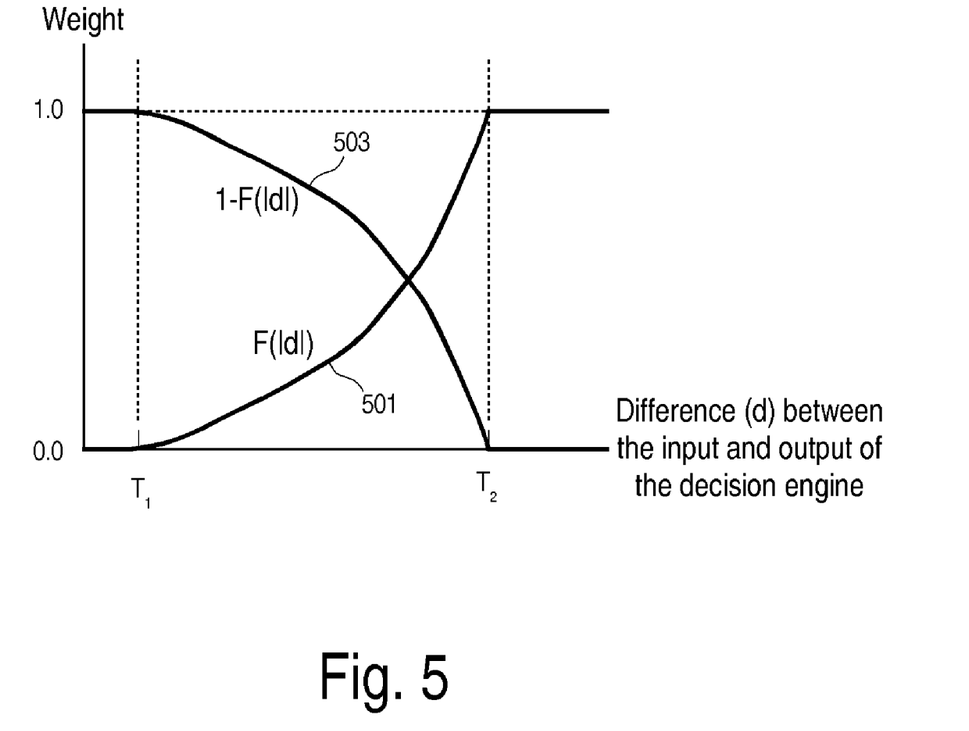
FIG. 5 shows example weight functions according to an embodiment of the invention.

FIG. 5 shows example weight functions according to an embodiment of the invention. In FIG. 5, the weight functions (501 and 503) are computed based on the difference (d) between the input and output of the decision engine. The function F(|d|) may be a non-linear function or a linear function. The difference (d) indicates a level of confidence in the output of the decision engine.

In FIG. 5, when the modulus of the difference decreases, the weight function (503) for the error signal of a DMA type increases, while the weight function (501) for the error signal of a CMA type decreases. When the difference approaches a lower threshold $T_1$, the weight function (501) for the CMA error signal approaches zero. Thus, upon convergence the MSE of the equalizer is determined by the DMA type of error signal.

In FIG. 5, when the modulus of the difference increases, the weight function (503) for the error signal of a DMA type decreases, while the weight function (501) for the error signal of a CMA type increases. Thus, during the capture phase, in which the modulus of the difference between the input and output of the decision engine is large, the combined error is dominated by the CMA error signal, which allows the equalizer to converge in a large range in a way similar to a CMA equalizer.

In FIG. 5, after the modulus of the difference between the input and output of the decision engine increases beyond an upper threshold value $T_2$ (e.g., 1.0), the weight function (503) for the DMA error reaches zero. Thus, when the modulus of the difference is larger than the upper threshold value, the DMA error does not drive the adaptation; and the adaptation is based on the CMA error.

Figure 6:
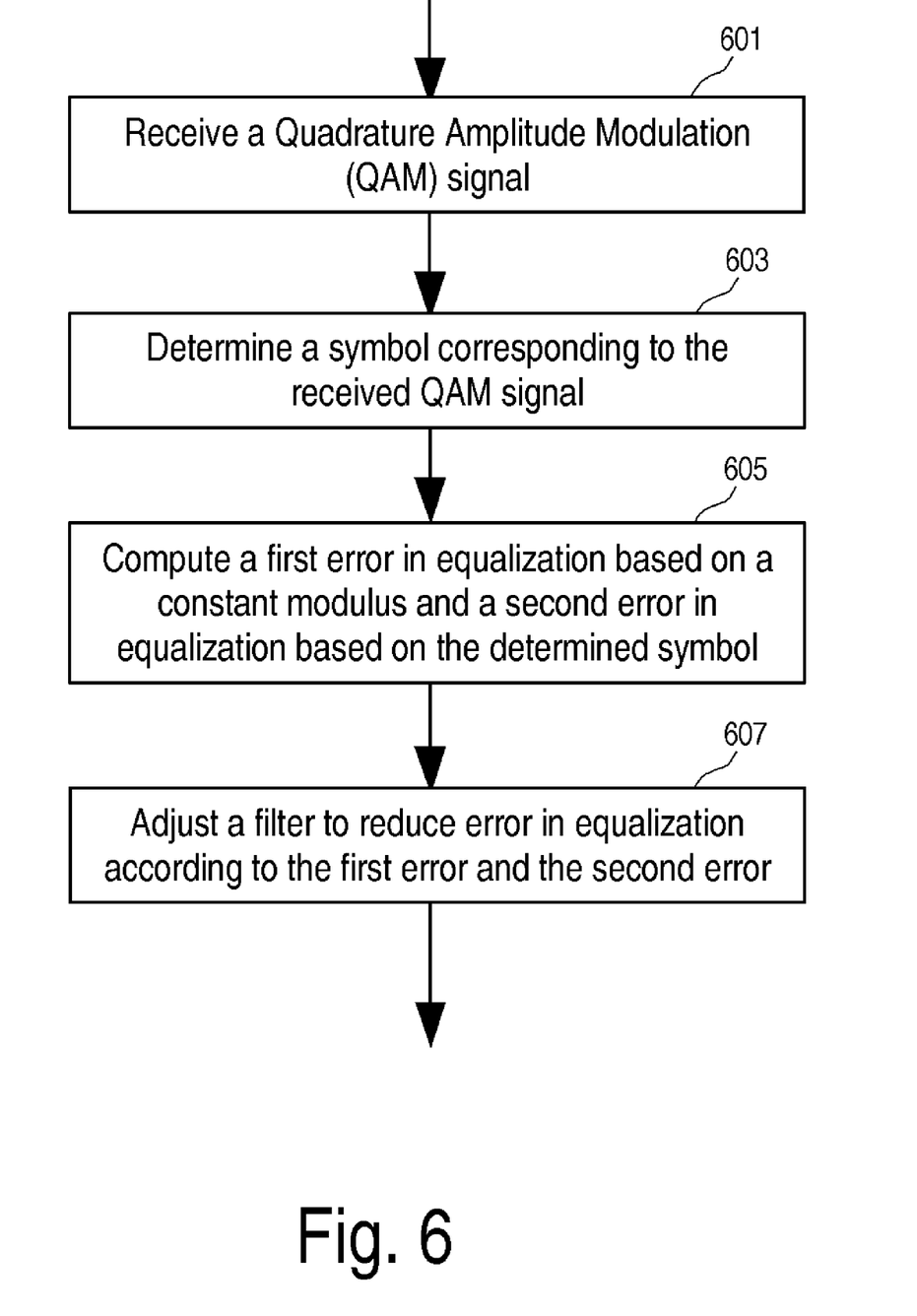
FIG. 6 shows a flow diagram of a process in a blind equalizer according to one embodiment of the invention.

FIG. 6 shows a flow diagram of a process in a blind equalizer according to one embodiment of the invention. A Quadrature Amplitude Modulation (QAM) signal is received (601) to determine (603) a symbol corresponding to the received QAM signal. A first error in equalization is computed (605) based on a constant modulus and a second error in equalization based on the determined symbol. A filter is adjusted (607) to reduce error in equalization according to the first error and the second error. The process can be performed in an iterative way. The filter can be adjusted to generate the subsequent QAM that is received (e.g., in the decision engine) and used to determine the subsequent symbol.

In one embodiment, when the difference between the received QAM signal and the determined symbol is small, the filter is adjusted according to the second, symbol-based error more than the first, constant modulus-based error. When the difference between the received QAM signal and the determined symbol is large, the filter is adjusted according to the first, constant modulus-based error more than the second, symbol-based error.

In the foregoing specification, the invention has been described with reference to specific exemplary embodiments thereof It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A Quadrature Amplitude Modulation (QAM) signal receiver, comprising:
    a filter to reduce error in equalization, the filter to output a QAM signal;
    a decision engine coupled to the filter to determine a symbol based on the QAM signal;
    a first error generator coupled to the filter to compute a first error signal based on the QAM signal and a constant;
    a second error generator coupled to the filter and the decision engine to compute a second error signal based on the QAM signal and the determined symbol;
    an error combinator coupled to the first and second error generators to generate a combined error signal from the first and second error signals; and
    an adaptation engine coupled with the error combinator and the filter to reduce a equalization error according to the combined error signal.

2. The receiver of claim 1, wherein the first error generator comprises a constant modulus algorithm (CMA) error generator.

3. The receiver of claim 2, wherein the second error generator comprises a decision modulus algorithm (DMA) error generator.

4. The receiver of claim 1, wherein the error combinator combines the first and second error signals according to a difference between the QAM signal and the determined symbol.

5. The receiver of claim 4, wherein the error combinator applies a first weight on the first error signal and a second weight on the second error signal to generate the combined error signal; and the first and second weights are determined based on the difference between the QAM signal and the determined symbol.

6. The receiver of claim 5, wherein the first weight decreases relative to the second weight to zero as the difference between the QAM signal and the determined symbol decreases; and the second weight decreases relative to the first weight to zero as the difference between the QAM signal and the determined symbol increases to above a threshold.

7. The receiver of claim 1, wherein the combined error signal is a weighted average of the first and second error signals; and the combined error signal is different from each of the first and second error signals.

8. A method, comprising:
    receiving a Quadrature Amplitude Modulation (QAM) signal;
    determining a symbol corresponding to the received QAM signal;
    computing a first error in equalization based on a constant modulus and a second error in equalization based on the determined symbol;
    combining the first error and the second error to generate a third error different from each of the first error and the second error; and
    adjusting a filter to reduce error in equalization according to the third error.

9. The method of claim 8, wherein the first error is based on a constant modulus algorithm (CMA) error.

10. The method of claim 9, wherein the second error is based on a difference between the determined symbol and the received QAM signal.

11. The method of claim 8, wherein said combining the first error and the second error comprises:
    weighting the first error against the second error according to a difference between the determined symbol and the received QAM signal.

12. The method of claim 11, wherein a weight for the first error decreases relative to a weight for the second error when the difference between the determined symbol and the received QAM signal decreases.

13. The method of claim 8, wherein said combining the first error and the second error comprises:
    determining a weighted average of the first error and the second error according to a difference between the determined symbol and the received QAM signal.

14. The method of claim 13, wherein a weight for the first error decreases towards zero when the difference between the determined symbol and the received QAM signal decreases towards a threshold.

15. The method of claim 14, wherein the weight for the second error decreases towards zero when the difference between the determined symbol and the received QAM signal increases towards a threshold.

16. A circuit, comprising:
    means for receiving a Quadrature Amplitude Modulation (QAM) signal;
    means for determining a symbol corresponding to the received QAM signal;
    means for computing a first error in equalization based on a constant modulus and a second error in equalization based on the determined symbols;
    means for combining the first error and the second error to generate a third error different from each of the first error and the second error; and
    means for adjusting a filter to reduce error in equalization according to the third error.

17. The circuit of claim 16, wherein the first error is based on a constant modulus algorithm (CMA) error; and the second error is based on a difference between a modulus of the determined symbol and a modulus of the received QAM signal.

18. The circuit of claim 16, wherein said means for combining comprises:
    means for weighting the first error against the second error according to a confidence level in the determined symbol.

19. The circuit of claim 18, wherein a weight for the first error decreases relative to a weight for the second error when the confidence level increases.

20. The circuit of claim 19, wherein the weight for the first error decreases towards zero when the confidence level increases towards a first threshold; and the weight for the second error decreases towards zero when the confidence level decreases towards a second threshold.

* * * * *